United States Patent [19]

Mullen

[11] Patent Number: 4,632,862
[45] Date of Patent: Dec. 30, 1986

[54] I-BEAM HONEYCOMB MATERIAL

[76] Inventor: Stephen J. Mullen, 12 Winthrop Ave., Beverly, Mass. 01915

[21] Appl. No.: 707,379

[22] Filed: Mar. 1, 1985

[51] Int. Cl.⁴ ............................ B32B 3/26; B32B 3/28
[52] U.S. Cl. .................................... 428/116; 428/119; 428/178; 428/184; 428/186; 428/593
[58] Field of Search ............... 428/116, 118, 119, 178, 428/184, 186, 593

[56] References Cited

U.S. PATENT DOCUMENTS

| | | | |
|---|---|---|---|
| 2,848,132 | 8/1958 | Davous | 428/116 |
| 3,086,624 | 4/1963 | Wyatt. | |
| 3,432,379 | 3/1969 | Anderson. | |
| 3,938,289 | 2/1976 | Falkenberg. | |
| 4,304,821 | 12/1981 | Hayase et al.. | |
| 4,336,292 | 6/1982 | Blair | 428/116 |

Primary Examiner—Paul J. Thibodeau
Attorney, Agent, or Firm—Kenway & Jenney

[57] ABSTRACT

Honeycomb structure material having a web fabricated from sheets or ribbons of material into corrugated members which are joined together in such a fashion that I-beams are formed, the I-beams being stacked one upon another and the stacks being spaced apart throughout the web.

4 Claims, 5 Drawing Figures

I-BEAM HONEYCOMB MATERIAL

BACKGROUND OF THE INVENTION

This invention relates in general to honeycomb assemblies and in particular to a honeycomb structure which incorporates cells forming I-beams Honeycomb material has come into increasing use in fields of application where both strength and light weight are needed. Basically, honeycomb material as it is commonly used consists of a sandwich of two planar sheets between which a cellular web is welded, brazed or otherwise fixed to form a unitary panel structure. As the name implies, the web is composed of hexagonal cells formed by joining corrugated sheets of similar configuration but displaced laterally to form webs as in natural honeycomb. Various materials are used for both sheets and web depending upon the intended application, and they include steel, aluminum, stainless steel, titanium, and numerous alloys, both common and exotic.

Certain honeycomb applications are obvious. Aircraft components immediately come to mind because there lightness of weight and structural strength are of overriding importance. Moreover, the applications are not limited merely to straightforward articles such as wing and fuselage members. Much work has been done in fabricating and working honeycomb material into a variety of shapes useful in piping, bearings, rings, casings and a host of other components. The cellular nature of the web also enables its use in heat exchangers, flow straighteners and sound suppression.

When great strength is the objective, honeycomb panels are usually made up of at least two planar face sheets and the honeycomb web is sealed between them with the axes and sides of the cells perpendicular to the planes of the flat sheets. In that position, denoted here as vertical, of course, it is not possible to pump fluids through the structure incorporating the web in any direction except that generally parallel to the axes of the cells. That is a severe disadvantage in many applications, such as de-icing the wing of an aircraft. Problems of a similar nature are encountered in all applications in which a relatively unrestricted flow of fluid or even the efficient storage of fluid in a structure is desired. In tanks and pipes which are reinforced conventionally with solid struts or dividers, the substitution of conventional honeycomb has generally been avoided because it would inhibit the flow of gas or liquid.

It is the primary object of the present invention to increase the strength of honeycomb structures.

It is another object of the present invention to broaden the fields of application of honeycomb materials.

Yet another object of the invention is to reduce the cost of producing honeycomb material.

Still another object is the fabrication of honeycomb structures in which efficient fluid flow is facilitated.

SUMMARY OF THE INVENTION

Basically, the objects of the present invention are met by a unique modification and reorientation of the web of a honeycomb structure. Rather than constructing the web to form myriad six-sided cells joined together conventionally, I-beam members are incorporated in the web. The six-sided cells in the simplest case are formed first conventionally by corrugating a sheet of material to form a series of top surfaces or flats which are joined to parallel bottom surfaces or flats by slant walls which are at angles to the respective surfaces. Stated otherwise, the corrugations in each sheet are in the form of truncated pyramids, each being inverted relative to its neighbors. Two such corrugated sheets when displaced laterally by the width of a pyramid and joined by welding or otherwise bonding the flats of one corrugated sheet to those of another sheet form the six-sided cells. Additional similarly corrugated sheets are similarly joined to form more extensive webs and the entire web is then sandwiched between planar face sheets.

In this invention, the conventional honeycomb is further formed by centrally depressing each major surface or flat of the corrugated sheets to form parallel sub-flats which are connected to the original major flats by walls which are perpendicular to both the flats and the sub-flats. Joining two or more such corrugated sheets with alternate sheets inverted by bonding sub-flats to sub-flats and flats to flats produces a honeycomb web which incorporates I-beams extending end-to-end through the web.

For a better understanding of the present invention, together with its other features and advantages, reference should be made to the description below of a preferred embodiment which is shown in the appended drawing in which:

DESCRIPTION OF PREFERRED EMBODIMENT

Figure 1:
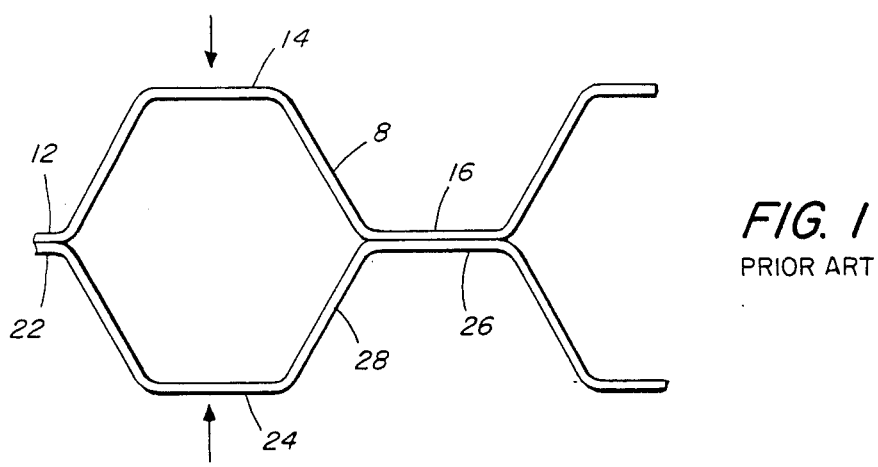
FIG. 1 shows fragmentarily prior art honeycomb web material.

In the prior art design of FIG. 1 there may be seen a first sheet 12 which may be made of steel, aluminum, titanium, stainless steel or any one of a number of alloys. The sheet 12 is formed into corrugations which are shaped into what may be termed truncated pyramids alternately inverted. The truncated top major surface or flat 14 is connected to a parallel surface or flat 16 by a slant wall 18. The wall 18 and the flat 14 enclose an angle of 120 degrees. The wall 18 and the flat 16 enclose a similar 120 degree angle.

A second sheet 22 is corrugated identically to the sheet 12 and includes similar major flats 24 and 26 and slant wall 28. The sheet 22 is displaced laterally or lengthwise relative to the sheet 12 by the width of a pyramid base and flats 16 and 26 are welded or otherwise joined together as are similar flats along the length of the sheets. This is the basic nature of the web of conventional honeycomb material, and a plurality of such cells or building blocks may be formed and joined together and enclosed in a sandwich of plane sheets. Also, of course, plane sheets may be interposed as desired between web members within the sandwich.

Figure 2:
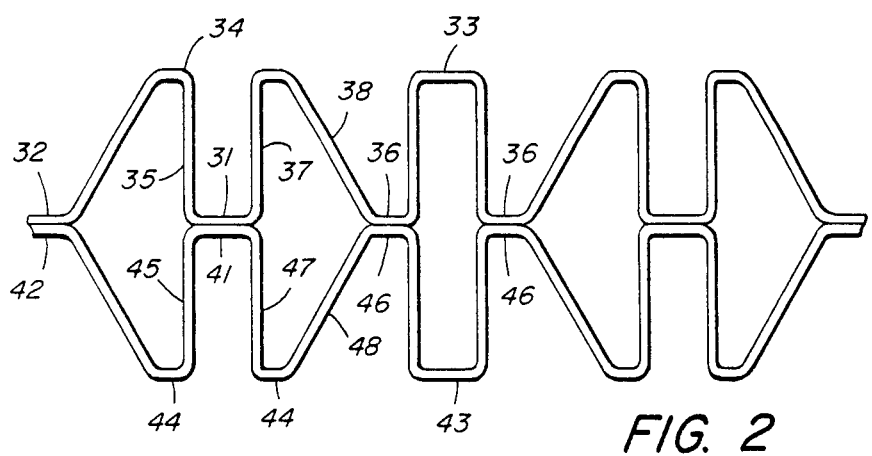
FIG. 2 shows fragmentarily honeycomb web made in accordance with the present invention.

FIG. 2 may be viewed as a modification of FIG. 1 in that it includes a corrugated sheet 32 having a major flat 34 connected to a parallel major flat 36 by a slant wall 38. Likewise, a second corrugated sheet 42 may be considered to have a major flat 44 connected to a parallel flat 46 by a slant wall 48. The flats 36 and 46 as well as similar flats are welded together to form the web.

Additionally, however, each major flat such as 34,36, and 44,46 has its central area depressed to form parallel surfaces or sub-flats such as 31,33 and 41,43. The walls 35 and 37 joining the sub-flat 31 to the flat 34 are perpendicular to the flat 34 and to the sub-flat 31. Likewise, the walls 45 and 47 joining the flat 44 to the sub-flat 41 are normal to those parallel members. The sub-flats 31 and 41 are welded or otherwise sealed together and what is here denoted as an I-beam is formed with the flat 34 forming one flange which is connected to the parallel flange formed by the flat 44 by means of the vertical walls 35,45 and 37,47.

Figure 3:
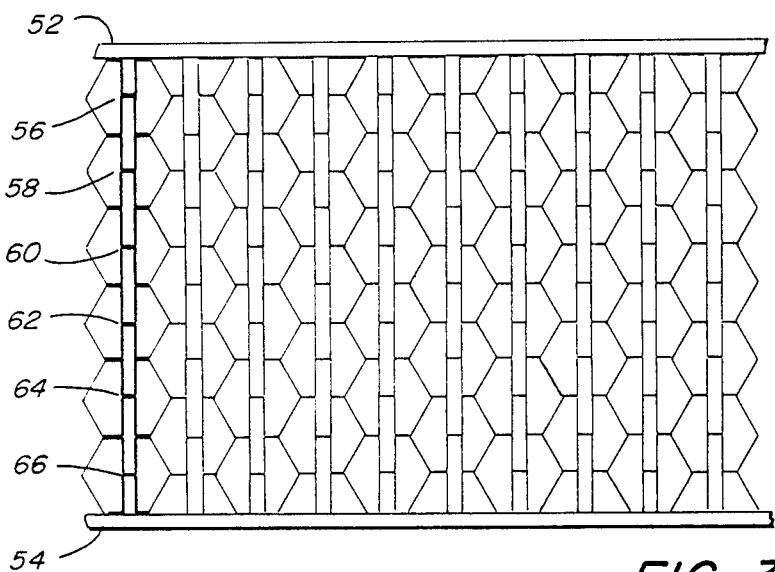
FIG. 3 shows a panel of honeycomb material made in accordance with the present invention.

In FIG. 3, a portion of a honeycomb panel including planar face sheets 52 and 54 is shown. Ten sets of stacked I-beams are shown. Typically, the first stack running between the face sheets 52 and 54 includes the I-beams 56, 58, 60, 62, 64, and 66. Each I-beam is, of course, welded to the next beam in the stack with the I-beam 56 being welded to the face sheet 52 and the I-beam 66 being welded to the face sheet 54. The total effect of the multiple stacks is to create a panel structure which is 100-150 times as strong as a panel incorporating conventional honeycomb web. At the same time, the open nature of the I-beams permits relatively free flow of fluids in a horizontal direction (into the paper in the orientation shown).

Figure 4:
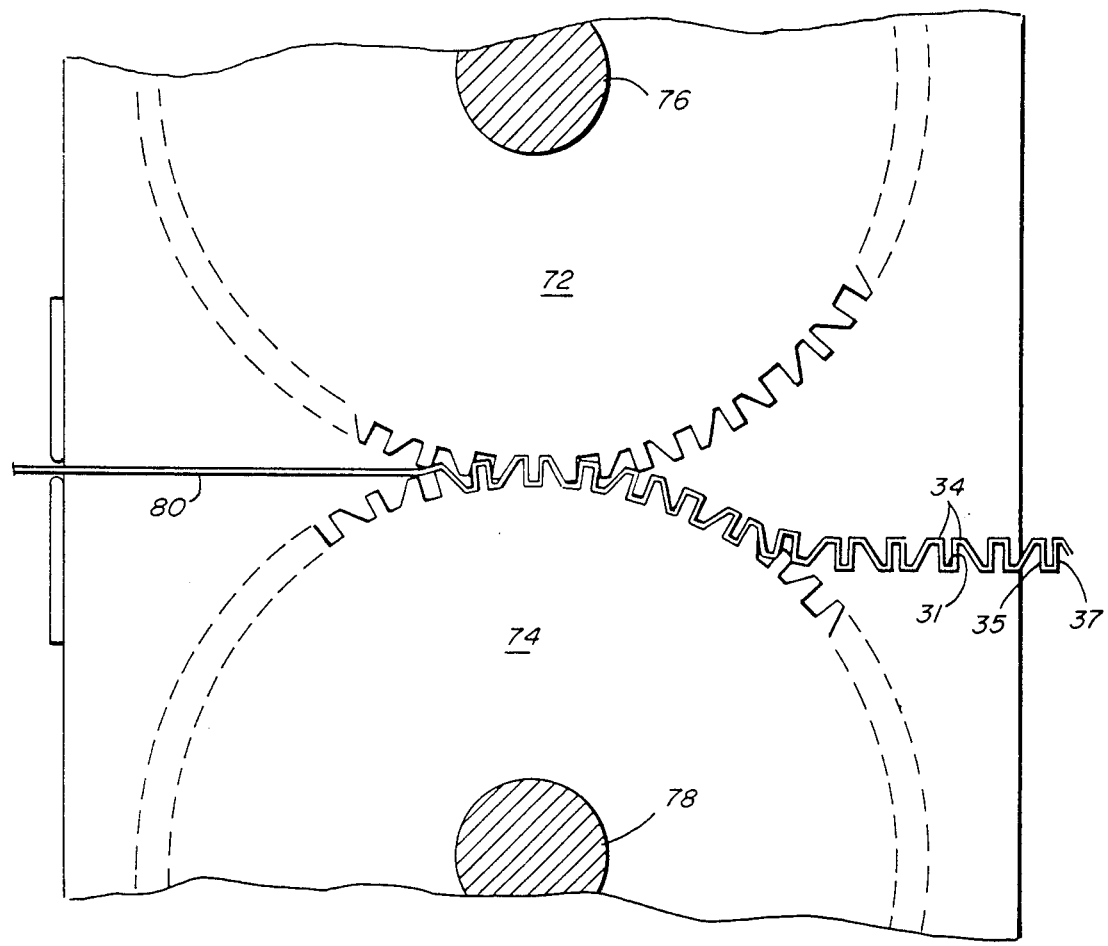
FIG. 4 illustrates a pair of meshing rolls by which honeycomb web of the invention may be formed.

In FIG. 4 there may be seen one type of equipment with which planar sheets may be deformed to produce corrugated web material in accordance with the invention. The equipment includes cooperating rolls 72 and 74 mounted for rotation on axles 76 and 78 respectively. The rolls have complementary peripheral teeth which mesh together upon a planar sheet which is fed from left to right as shown through the rolls.

As the sheet 80 emerges from the nip of the rolls, it will be seen to have been corrugated to form flats 34 and parallel sub-flats 31 connected by vertical walls 35 and 37 as shown in FIG. 2. Additional sheets similarly corrugated can be welded at the appropriate flats and sub-flats to create the web material of FIGS. 2 and 3.

Figure 5:
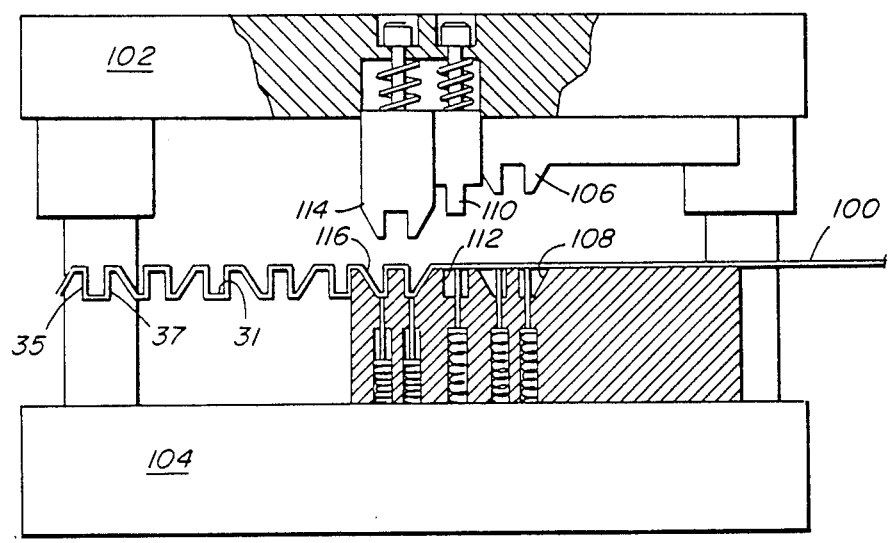
FIG. 5 illustrates a die stamping system by which the web of the invention may be formed.

An alternative forming process and suitable equipment for deforming planar sheets to produce the web of the invention is shown in FIG. 5. In this instance, a die stamping machine including a vertically reciprocating head cooperates with a fixed bed 104 to form the sheet 100 as it is fed in a right-to-left direction. A first punch 106 commences the formation of the sheet 100 in a die 108. It is followed by a punch 110 cooperating with a die 112 and a punch 114 cooperating with a die 116. All punches and dies are preferably spring-loaded in the manner shown as is conventional in forming sheet metal.

At the completion of the die-stamping process, the sheet emerges in corrugated form again having flats 34 connected by vertical perpendicular walls 35 and 37 to parallel sub-flats 31.

Panels formed in the manner shown and described in connection with FIG. 3 incorporate the honeycomb web in what is here denoted as a horizontal position. As previously noted, it has generally been considered necessary to incorporate conventional honeycomb web in a vertical portion to achieve great strength. The vertical orientation of the web has hindered or even prevented the use of such honeycomb where a through flow of fluids was desired. With horizontally disposed honeycomb web as here disclosed, relatively easy through flow is achieved as is strength comparable to that of vertically disposed conventional honeycomb web.

In addition to such items as aircraft wings through which it is desired to pump hot gas for de-icing purposes, other elements having useful open wall design are possible. The nature of the I-beam honeycomb design is such that it lends itself to formation of panels in a radius. Thus, strong-walled piping, drums and other cylindrical structures can be formed without resort to solid reinforcing struts, which would inhibit the flow of fluids through the structure. Myriad other applications are also feasible in heat transfer systems, aerospace, oil and chemical refining and processing, noise suppression, radio-frequency shielding and even such mundane articles as pool tables, all of which place a premium upon light weight and great strength.

What is claimed is:

1. In an open-cell honeycomb web comprisng at least a pair of similar sheets having corrugations in the shape of major flat surfaces formed therein and displaced relative to each other whereby said major flat surfaces of each of said sheets abut each other, the combination wherein each of said major flat surfaces has a central portion thereof depressed to form matching sub-flat surfaces parallel to and connected to said major flat surfaces by walls substantially perpendicular to said flat surfaces, the undepressed portions of said major flat surfaces being joined together and said sub-flat surfaces being joined together whereby a series of I-beams are formed each said I-beam being disposed within one of said open cells comprising said honeycomb web.

2. In a honeycomb web as defined in claim 1, the combination therewith of additional pairs of corrugated sheets, each said sheet having major flat surfaces lying in parallel planes and bonded to certain of said major flat surfaces of said first pair of corrugated sheets, slant walls connecting said major flat surfaces, each said major flat surface having its central portion depressed to form a sub-flat surface parallel and connected to said major flat surface by walls perpendicular to said major flat surface and to said sub-flat surface.

3. In a honeycomb web as defined in claim 1, the combination therewith of a first planar sheet joined to the uppermost of said corrugated sheets and a second planar sheet joined to the lowermost of said corrugated sheets whereby stacked I-beams are formed between said planar sheets.

4. In a honeycomb web as defined in claim 1, the combination wherein each said corrugated sheet comprises a planar sheet deformed in a pattern of truncated pyramids successively reversed in orientation and having central portions of the major surfaces thereof depressed to form sub-flats parallel to said major surfaces.

* * * * *